D. F. SHULAR.
CORN PLANTER.
APPLICATION FILED AUG. 5, 1908.
927,607.
Patented July 13, 1909.
2 SHEETS—SHEET 1.
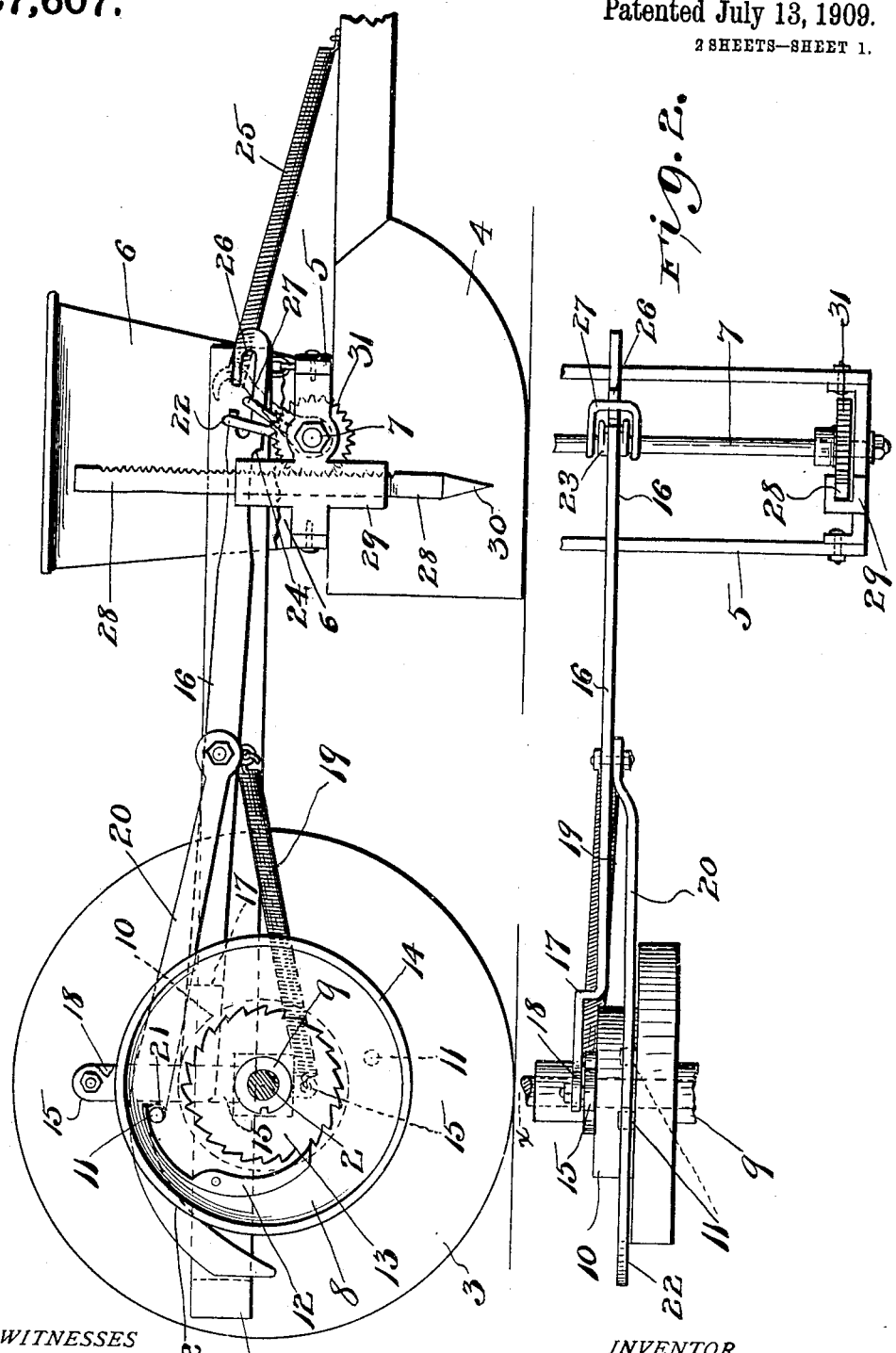

D. F. SHULAR.
CORN PLANTER.
APPLICATION FILED AUG. 5, 1908.
927,607.
Patented July 13, 1909.
2 SHEETS—SHEET 2.
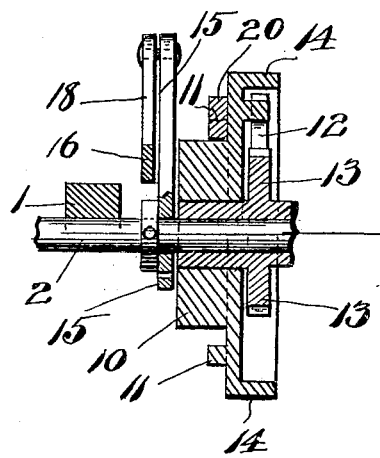
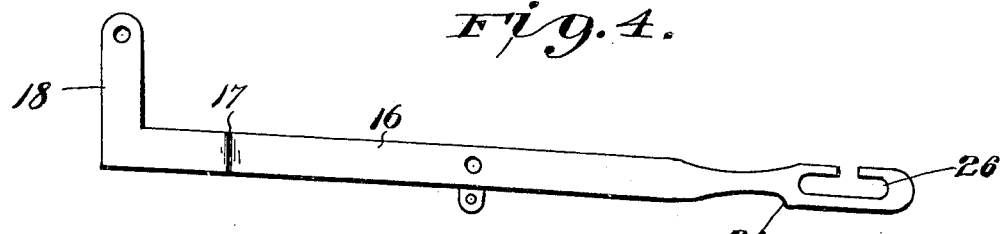
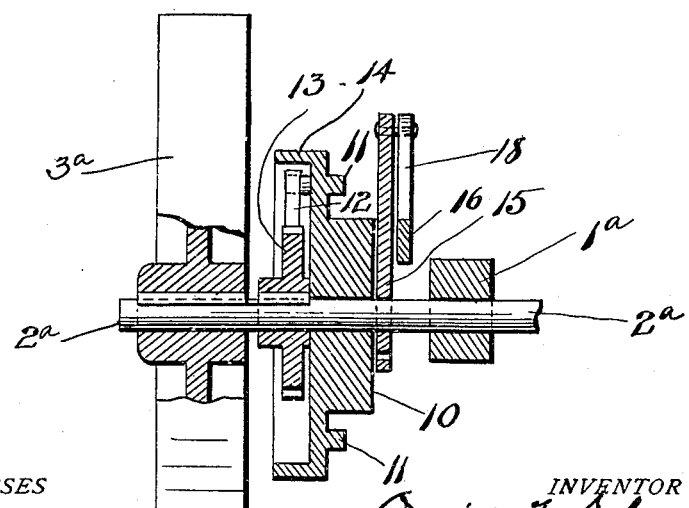
WITNESSES
INVENTOR
David F. Shular
by D. A. Gourick
Attorney

UNITED STATES PATENT OFFICE.

DAVID F. SHULAR, OF CRAWFORDSVILLE, INDIANA.

CORN-PLANTER.

No. 927,607.  Specification of Letters Patent.  Patented July 13, 1909.

Application filed August 5, 1908. Serial No. 447,043.

*To all whom it may concern:*

Be it known that I, DAVID F. SHULAR, a citizen of the United States, residing at Crawfordsville, in the county of Montgomery and State of Indiana, have invented certain new and useful Improvements in Corn-Planters, of which the following is a specification.

My invention relates to corn planters of the class in which the dropping mechanism is operated by power transmitted from the traction wheels and has for its object the provision of improved mechanism for operating the seed dropper and the provision of a marker operated by the dropping mechanism for marking the ground opposite each hill planted, so that in starting the machine at the ends of the rows or when going around obstructions the machine may be set to start dropping opposite to the hill in the adjoining row so that the hills may be in line across the field to permit cultivation of the corn in two directions.

The construction and operation of my improved machine will be described in detail hereinafter and illustrated in the accompanying drawings in which—

Figure 1 is a side view partly in section of a corn planter involving my improvements, Fig. 2, a top plan view of the seed drop and marking mechanism, Fig. 3, a central vertical, transverse sectional view of the operating mechanism, Fig. 4, a detail view of the operating rod, Fig. 5, a detail view of the trigger, Fig. 6, a detail view of the guide link, and Fig. 7, a view partly in section showing a modified form in which the mechanism is mounted on a rotatable axle.

In the drawings similar reference characters indicate corresponding parts in the several views.

The frame 1 of the corn planter is supported by the axle 2 on which are journaled the wheels 3.

4 indicates the shoes or furrow openers supporting the frame 5 on which are mounted the seed boxes 6, the valves in said boxes being operated by the shaft 7.

A ring 8 is revolubly mounted on hub 9 of one of the wheels 3 having a circular projection 10 on one side and two pins 11 projecting from the same side. 12 indicates a spring-actuated pawl secured to the other side of the ring and 13 a ratchet wheel keyed to hub 9 to engage said pawl. A flange 14 extends from the edge of ring 8 to protect the pawl and ratchet, 12, 13, from the weather and sand and dirt as well as to provide a hand hole in operating the mechanism by hand to set it in starting as hereinafter described.

15 indicates a lever pivotally mounted intermediate of its ends on axle 2, 16 a rod having one end offset as shown at 17 and with an upright piece 18 secured thereto, said upright piece having its free end pivotally secured to the upper end of lever 15, while the other end of the lever is connected to the rod 16 by means of a coil spring 19.

20 indicates an arm pivotally secured to rod 16, having a shoulder 21 on its lower side to engage pins 11 and a downwardly curved portion 22 that engages the pin while traveling toward shoulder 21 and lifts the arm 20 so that the shoulder engages it, the arm when not engaging one of the pins resting on the circular projection 10.

By this construction it will be understood that when the planter is actuated in a forward direction the ring 8 is rotated and the pins 11 alternately engage the shoulder 21. When a pin 11 engages shoulder 21 the rod 16 is actuated in a forward direction, against the resistance of spring 19, until the lower edge of the downwardly curved portion 22 engages circular projection 10 when the arm 20 is raised so that the shoulder 21 is lifted from engagement with the pin and the rod is released by the action of the spring 19 and the parts are returned to their normal position.

23 indicates a trigger secured to shaft 7 having prongs 23ª spaced apart to receive the free end of rod 16 which is formed with a shoulder 24 that engages a bar 23ᵇ connecting the prongs 23ª when the rod is moved forward as hereinbefore described and when returned to its normal position by spring 19 the shaft is rocked to momentarily open the valves in the seed boxes, the shaft being returned to its normal position with the valves closed by means of spring 25 or its equivalent.

26 indicates an open slot in the end of rod 16 and 27 a link loosely mounted on shaft 7 and engaging said slot to hold the rod in engagement with trigger 22.

In order to mark the place where seed is deposited I provide a marker consisting of a rack bar 28 slidably mounted in a guide 29 having a pointed lower end 30, and a pinion 31 keyed to the shaft 7 that meshes with said rack-bar 28, so that each time that the shaft is rocked as heretofore described the bar 28 is actuated downwardly and the earth is marked opposite to where the seed is dropped.

When in use and it is desired to start the machine at the end of a row or after going around an obstruction in the field the machine is stopped so that the bar 28 is opposite the place marked in the adjacent row to show that seed has been dropped and the ring 8 is then actuated by hand until the shaft 7 is rocked to drop seed. The machine may then be started forward and seed will be dropped at regular intervals opposite to the places in adjoining rows. When it is desired to stop the operation of the dropping and marking mechanism the arm 20 is raised and held so that the pins 11 do not engage shoulder 21.

In Fig. 7 my device is shown applied to a corn planter in which the axle $2^a$ is journaled in frame $1^a$ and the wheels $3^a$ are rigidly secured to the axle. In this form of machine the ring 8 and lever 15 are revolubly mounted on the axle $2^a$, and the ratchet wheel 13 keyed to the axle. The other parts are secured and operate in the same manner as described in connection with the preferred form shown in Figs. 1, 2, 3 and 4 so that it is deemed unnecessary to describe them in detail as to the modification shown in Fig. 5, reference being had to the description above.

Having thus described my invention what I claim is—

1. In a corn planter, in combination with the shaft for operating the seed dropping mechanism, a pinion secured to the shaft, and a marker bar mounted to slide vertically and having a rack face to engage the pinion aforesaid.

2. In a corn planter, in combination with a rock shaft for operating the seed dropping mechanism, a trigger secured to said shaft, a rod loosely engaging said trigger, and means to actuate said rod to intermittently rock the shaft aforesaid.

3. In a corn planter, in combination with the traction wheels, and a rock shaft for operating the seed dropping mechanism, a trigger secured to the shaft, a rod having a hook to engage said trigger, and means secured to one of the traction wheels to intermittently actuate said rod.

4. In a corn planter, in combination with the axle, the traction wheels mounted on the axle, and a shaft for operating the seed dropping mechanism, a trigger secured to the shaft, a lever mounted on the axle, a rod pivotally secured to one arm of the lever and having a hook to engage the trigger, an arm pivotally secured to the rod, and means secured to one of the traction wheels to intermittently engage the arm to actuate the rod.

5. In a corn planter, in combination with the axle, the traction wheels mounted on the axle, and a shaft for operating the seed dropping mechanism, a trigger secured to the shaft, a lever mounted on the axle, a rod pivotally secured to one arm of the lever and having a hook to engage the trigger, a ring mounted on the axle, an arm pivotally secured to the rod, and means secured to said ring to intermittently engage the arm to actuate the rod.

6. In a corn planter, in combination with the axle, the traction wheels mounted on the axle, and a shaft for operating the seed dropping mechanism, a trigger secured to the shaft, a lever mounted on the axle, a rod pivotally secured to one arm of the lever and having a hook to engage the trigger, a ring mounted on the axle, an arm pivotally secured to said rod and having a shoulder, and pins secured to said ring to engage said shoulder.

7. In a corn planter, in combination with the axle, the traction wheels mounted on the axle, and a shaft for operating the seed dropping mechanism, a trigger secured to the shaft, a lever mounted on the axle, a rod pivotally secured to one arm of the lever and having a hook to engage the trigger, a coil spring connecting the rod and the free arm of the lever, a ring rotatably mounted on the axle, a ratchet and pawl connecting said ring and axle, pins on said ring, and an arm pivotally secured to the rod and having a shoulder thereon to engage said pins.

8. In a corn planter, in combination with the axle, the traction wheels mounted on the axle, and a shaft for operating the seed dropping mechanism, a pinion keyed to the shaft, a rack-bar slidably mounted and meshing with said pinion, a trigger secured to the shaft, a lever mounted on the axle, a rod pivotally secured to one arm of the lever and having a hook to engage the trigger, a coil spring connecting the rod and the free arm of the lever, a ring rotatably mounted on the axle, a ratchet and pawl connecting said ring and axle, pins on said ring, and an arm pivotally secured to the rod and having a shoulder thereon to engage said pins.

In testimony whereof I hereunto affix my signature in the presence of two witnesses.

DAVID F. SHULAR.

Witnesses:
 J. D. EMMERT,
 C. W. BROWN.